Oct. 15, 1963  J. L. WINGE  3,106,991
BRAKE CAMSHAFT BEARING
Filed Jan. 2, 1962  2 Sheets-Sheet 1
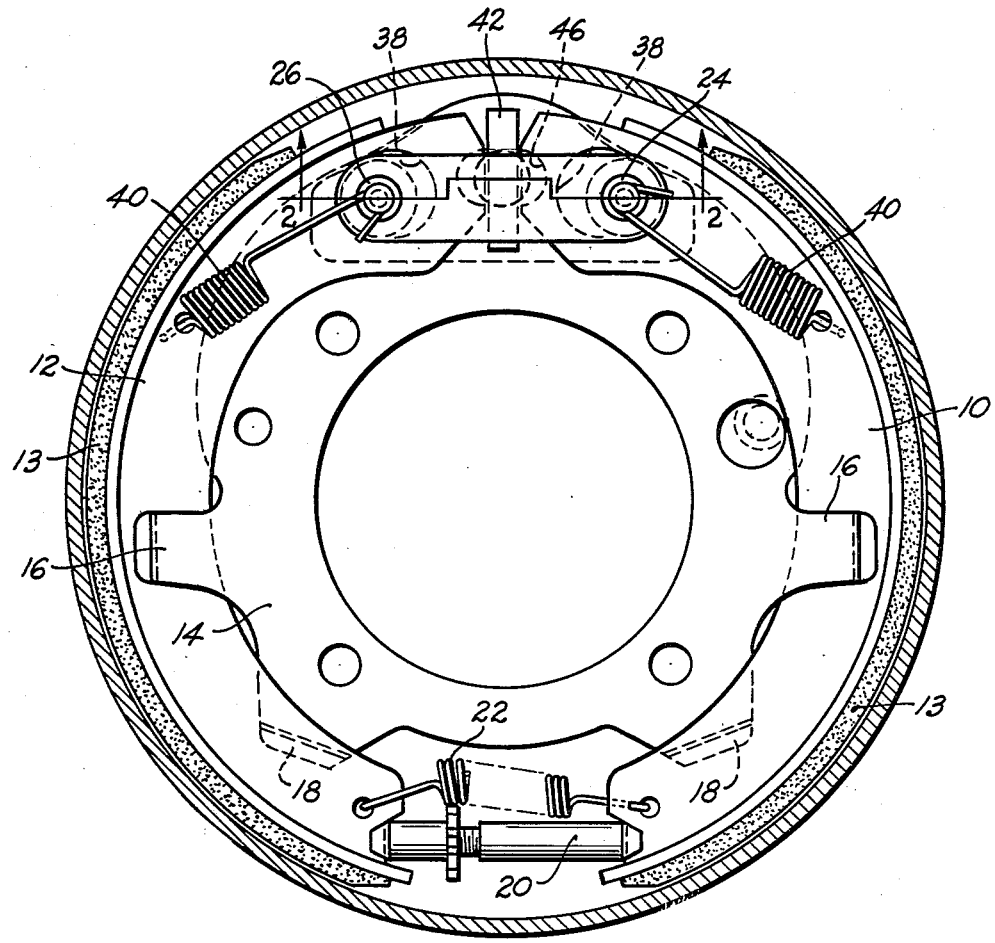
FIG_1
INVENTOR.
JOHN L. WINGE.
BY
Sheldon F. Rojes
ATTORNEY.

Oct. 15, 1963
J. L. WINGE
3,106,991
BRAKE CAMSHAFT BEARING
Filed Jan. 2, 1962
2 Sheets-Sheet 2
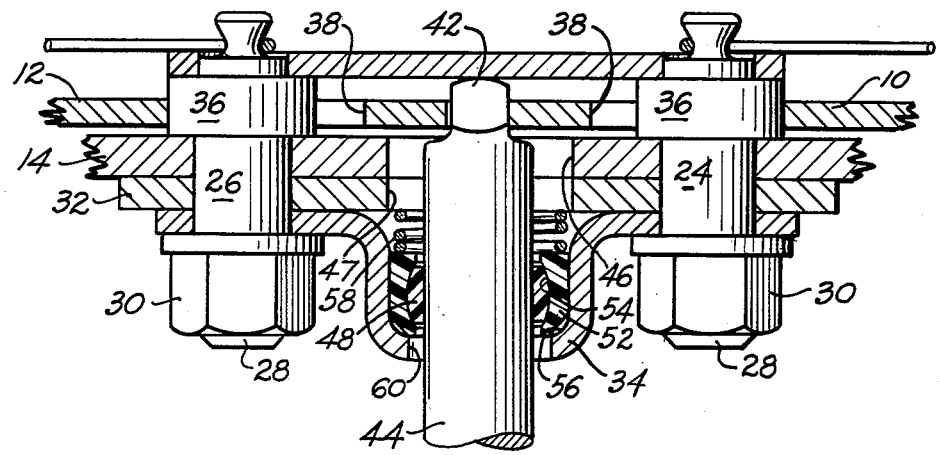
FIG_2
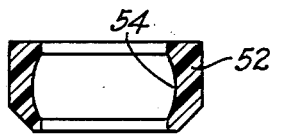
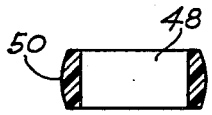
FIG_3          FIG_4
INVENTOR.
JOHN L. WINGE.
BY
Sheldon F. Raizes
ATTORNEY.

3,106,991
BRAKE CAMSHAFT BEARING
John L. Winge, South Bend, Ind., assignor to The Bendix
Corporation, South Bend, Ind., a corporation of Delaware
Filed Jan. 2, 1962, Ser. No. 163,652
1 Claim. (Cl. 188—78)

This invention concerns mounting structure for swivelly supporting a brake actuating shaft.

More particularly, the invention concerns a two-piece bearing means for the cam actuating shaft inserted between the shaft and its support member.

In brake constructions which utilize a cam actuating shaft, it is well known that the actuating shaft is mounted in its support by means of a ball joint or the like. Damage to the support and shaft is often incurred due to such construction.

It is an object of this invention to provide a cam actuating shaft of a brake with an improved bearing between the actuating shaft and the support therefor.

Another object of the invention is to provide a two-piece mounting constructed of plastic material having a low coefficient of friction with one of the pieces being carried by the other in a manner that they cannot be accidentally separated while enough relative movement is provided between the two pieces to allow for angular movement of the actuating shaft which is connected to the piece carried by the other.

The novel features and advantages of the invention will become apparent from the following description with reference to the accompanying drawings in which:

FIGURE 1 is a front elevation of a brake assembly embodying the invention;

FIGURE 2 is a view in section, at an enlarged scale, showing the improved mounting structure for the actuating shaft, the section being taken along line 2—2 of FIGURE 1;

FIGURE 3 is a view illustrating the guide member; and

FIGURE 4 is a view illustrating the bearing member.

The brake shown in FIGURE 1 comprises brake shoes 10 and 12 which are of a usual T-section construction and are lined with friction material 13. The shoes 10 and 12 are mounted on a fixed support formed such as spider 14, having projections 16 and 18 which act as guides for the shoes to position the latter. The shoes are interconnected at their lower end by a floating adjustable strut 20 and a tension spring 22.

The shoes 10 and 12 anchor respectively on anchor pins 24 and 26 which extend through the spider 14 and are threaded at their ends 28 to receive a nut 30 which clamps a reinforcing plate 32 and the ends of a U-shaped bracket 34 against the spider 14. Each anchor pin has an anchor boss 36 applied against the fixed support and received through an enlarged opening 38 of the respective brake shoe, so that each brake can move in a radially outward direction but bears on the anchor boss 36 for immediate braking. The shoes are maintained against the anchor bosses by means of return springs 40 which are inserted between the shoes and the anchor pins 24 to hold the shoes in a normally retracted position.

Between the adjacent actuatable ends of the shoes is a rectangular cam 42 which bears directly against the shoes and is formed integrally with an actuating shaft 44. In order that the cam 42 can follow-up the movement of the shoes, the actuating shaft 44 extends through elongated openings 46 and 47 respectively formed in the spider 14 and the reinforcing plate 32.

The actuating shaft 44 is supported by a resilient bearing 48 having a spherical outer surface 50 and carried by a guide ring 52 which has a complementary spherical recess 54 providing swivel movement of the bearing 48 therein. The bearing 48 is press fitted in the guide ring 52 and the two parts 48 and 52 are almost locked firmly together with enough relative movement between the two parts 48 and 52 being provided to allow for angular movement of the camshaft 44 supported by the bearing 48. The guide ring 52 is located within the bracket 34 and biased against the end surface 56 of the bracket by a coil spring 58 compressed between the guide ring 52 and the reinforcing plate 32. The actuating shaft 44 extends through an opening 60 of the bracket, said opening having a diameter greater than that of the shaft so that said shaft is free to swivel therein, and due to the provision of the bearing 48 and ring 52 no damage is caused to the bracket 34 or to the shaft itself when the shaft is rotated. The bearing 48 and guide ring 52 may be constructed from any plastic material which has high strength, and inherently low coefficient of friction surface requiring no lubrication, and which is manufacturable at reasonable cost such as Teflon and nylon. By using bearing and the guide members made of such type of plastic material, the assembly of the parts of the mounting structure is relatively simple and no lubrication is required during the useful life of the brake.

In operation, when the shaft 44 is rotated, the cam 42 exerts a spreading force on the ends of the brake shoes. If the brake drum is rotating in the counterclockwise direction (FIGURE 1) the shoe 12 will leave its anchor pin and the braking torque will be transmitted through the shoe 10 to the respective anchor pin 24. If the brake drum is rotating in the clockwise direction the shoe 10 will leave its anchor pin and the braking torque will be transmitted through the shoe 12 to the anchor pin 26. Therefore, depending upon the direction of the drum rotation the shaft 44 will be rotated angularly and the cam end 42 of said shaft will be shifted to the left, or to the right as shown in FIGURE 1. The shaft portion projecting through the opening 60 is guided by the bearing 48 which bearing is permitted a sufficient relative movement with respect to guide ring 52 to allow for the movement of the cam shaft.

Other revisions of the invention or variations will become apparent to those skilled in the art and will suggest themselves from specific applications of the invention. It is intended that such variations and revisions of the invention as are reasonably to be expected on the part of those skilled in the art to suit individual design preference and which incorporate the herein disclosed principles will be included within the scope of the following claim as equivalents thereof.

I claim:

In a brake, brake shoes arranged in end to end relationship, a support member for said brake shoes, a bracket member extending rearwardly from the rear face of said support member and having a portion thereof spaced from said support member, a resilient bearing member having a substantially spherical outer surface, a resilient guide member having a complimentary recess, said bearing member being swivelly received in said guide member recess, said bearing member and said guide member being so constructed that the spherical surface of said recess engages the full spherical surface of said bearing member, said bearing member and guide member being disposed as a unit in said space between said support member and said bracket, a coiled compression spring operatively engaging said support member and said guide member for holding said guide member in fixed engagement with said bracket member, said bracket member, said bearing member and said support member having aligned openings therein, the opening in said support member being adjacent a pair of brake shoe ends, a camshaft extending through said openings and being connected to said bearing member with the cam portion thereof extending between said brake shoe ends, the portion of said shaft extending between said support member and said bearing member and guide member as a unit being surrounded by said compression spring, whereby said camshaft and bearing member are mounted for swivable motion as a unit relative to said support member, said guide member and said bracket.

References Cited in the file of this patent

UNITED STATES PATENTS

| | | |
|---|---|---|
| 1,633,984 | Fornaca | June 28, 1927 |
| 1,932,896 | Hunt et al. | Oct. 31, 1933 |
| 2,905,492 | Alexander | Sept. 22, 1959 |
| 3,017,209 | Thomas | Jan. 16, 1962 |

FOREIGN PATENTS

| | | |
|---|---|---|
| 141,477 | Sweden | July 28, 1953 |